(12) United States Patent
Ripperger

(10) Patent No.: US 8,568,679 B2
(45) Date of Patent: Oct. 29, 2013

(54) PROCESS FOR REMOVING SULFUR FROM A FUEL GAS STREAM ADDITIONALLY CONTAINING CARBON DIOXIDE AND LIGHT OLEFINS

(75) Inventor: Gary Lee Ripperger, Houston, TX (US)

(73) Assignee: Shell Oil Company, Houston, TX (US)

( * ) Notice: Subject to any disclaimer, the term of this patent is extended or adjusted under 35 U.S.C. 154(b) by 774 days.

(21) Appl. No.: 12/126,413

(22) Filed: May 23, 2008

(65) Prior Publication Data

US 2009/0050533 A1    Feb. 26, 2009

Related U.S. Application Data

(60) Provisional application No. 60/940,211, filed on May 25, 2007.

(51) Int. Cl.
*B01D 53/48* (2006.01)
(52) U.S. Cl.
USPC .............. 423/244.09; 423/242.1; 423/244.01; 423/244.02; 423/244.1; 208/208 R; 208/216 R
(58) Field of Classification Search
USPC .............. 208/216, 208 R; 423/242.1, 244.01, 423/244.03, 244.09, 244.1
See application file for complete search history.

(56) References Cited

U.S. PATENT DOCUMENTS

| | | | | |
|---|---|---|---|---|
| 1,904,441 A * | 4/1933 | Freyermuth et al. | .......... | 423/654 |
| 2,434,868 A | 1/1948 | Sample et al. | .................. | 196/30 |
| 3,428,429 A | 2/1969 | Carson | ............................. | 23/212 |
| 3,523,009 A * | 8/1970 | Weiss | ............................. | 423/123 |
| 3,730,694 A | 5/1973 | Wunderlich | ..................... | 48/213 |
| 3,966,875 A * | 6/1976 | Bratzler et al. | ................ | 423/220 |
| 4,153,671 A * | 5/1979 | Clements et al. | ......... | 423/244.02 |
| 4,153,674 A * | 5/1979 | Verloop et al. | ................. | 423/575 |
| 4,491,516 A | 1/1985 | Polleck et al. | ................. | 208/248 |
| 4,505,881 A * | 3/1985 | Diaz | ............................. | 423/236 |
| 4,508,693 A * | 4/1985 | Diaz | ............................. | 423/236 |
| 4,545,976 A * | 10/1985 | Osman | .......................... | 423/650 |
| 4,892,717 A * | 1/1990 | Hass | ............................. | 423/219 |
| 5,124,140 A * | 6/1992 | Okada et al. | ................... | 423/650 |

(Continued)

FOREIGN PATENT DOCUMENTS

| CN | 1195640 | 10/1998 | ............. B01D 53/48 |
|---|---|---|---|
| EP | 1690587 | 8/2006 | ............. B01D 53/75 |

(Continued)

OTHER PUBLICATIONS

Tong, Appraisal of Catalysts for the Hydrolysis of Carbon Disulfide, Jun. 1992, The Canadian Journal of Chemical Engineering, vol. 70, pp. 516-522.*
U.S. Appl. No. 12/101,036, filed Apr. 10, 2008.

*Primary Examiner* — Prem C Singh
*Assistant Examiner* — Michelle Stein
(74) *Attorney, Agent, or Firm* — Charles W. Stewart

(57) ABSTRACT

Disclosed is a process for the removal of sulfur from a fuel gas stream that additionally contains carbon dioxide and a light olefin as well as an organic sulfur compound. The process includes hydrotreating the fuel gas stream followed by a catalytic reduction of the resulting hydrotreated fuel gas to remove the carbonyl sulfide contained therein that is yielded in the hydrotreating step as a result of the equilibrium reaction of hydrogen disulfide with carbon dioxide to yield carbonyl sulfide and water.

14 Claims, 1 Drawing Sheet

(56) References Cited

U.S. PATENT DOCUMENTS

| | | | |
|---|---|---|---|
| 5,202,107 A * | 4/1993 | Kvasnikoff et al. | 423/574.1 |
| 5,401,391 A | 3/1995 | Collins et al. | 208/208 R |
| 5,482,617 A | 1/1996 | Collins et al. | 208/227 |
| 6,083,378 A | 7/2000 | Gildert et al. | 208/209 |
| 6,113,776 A | 9/2000 | Upson | 208/113 |
| 6,231,753 B1 | 5/2001 | McKnight et al. | 208/217 |
| 6,444,118 B1 | 9/2002 | Podrebarac et al. | |
| 6,533,255 B1 | 3/2003 | Mitsuhashi et al. | 261/149 |
| 7,037,485 B1 | 5/2006 | Drnevich et al. | 423/652 |
| 2004/0000507 A1 | 1/2004 | De Almeida et al. | 208/213 |
| 2004/0026298 A1 | 2/2004 | Ellis et al. | 208/210 |
| 2004/0055935 A1 | 3/2004 | Bakshi | 208/213 |
| 2006/0118465 A1 | 6/2006 | De Lasa | 208/208 R |
| 2007/0134147 A1 | 6/2007 | Graville | 423/242.1 |

FOREIGN PATENT DOCUMENTS

| | | | |
|---|---|---|---|
| GB | 1044771 | 10/1966 | C07C 7/00 |
| JP | 03033191 | 2/1991 | B01D 53/86 |
| WO | WO9807502 | 2/1998 | B01D 53/86 |
| WO | WO2006013206 | 2/2006 | B01D 53/48 |
| WO | WO2006125759 | 11/2006 | B01J 8/22 |

* cited by examiner

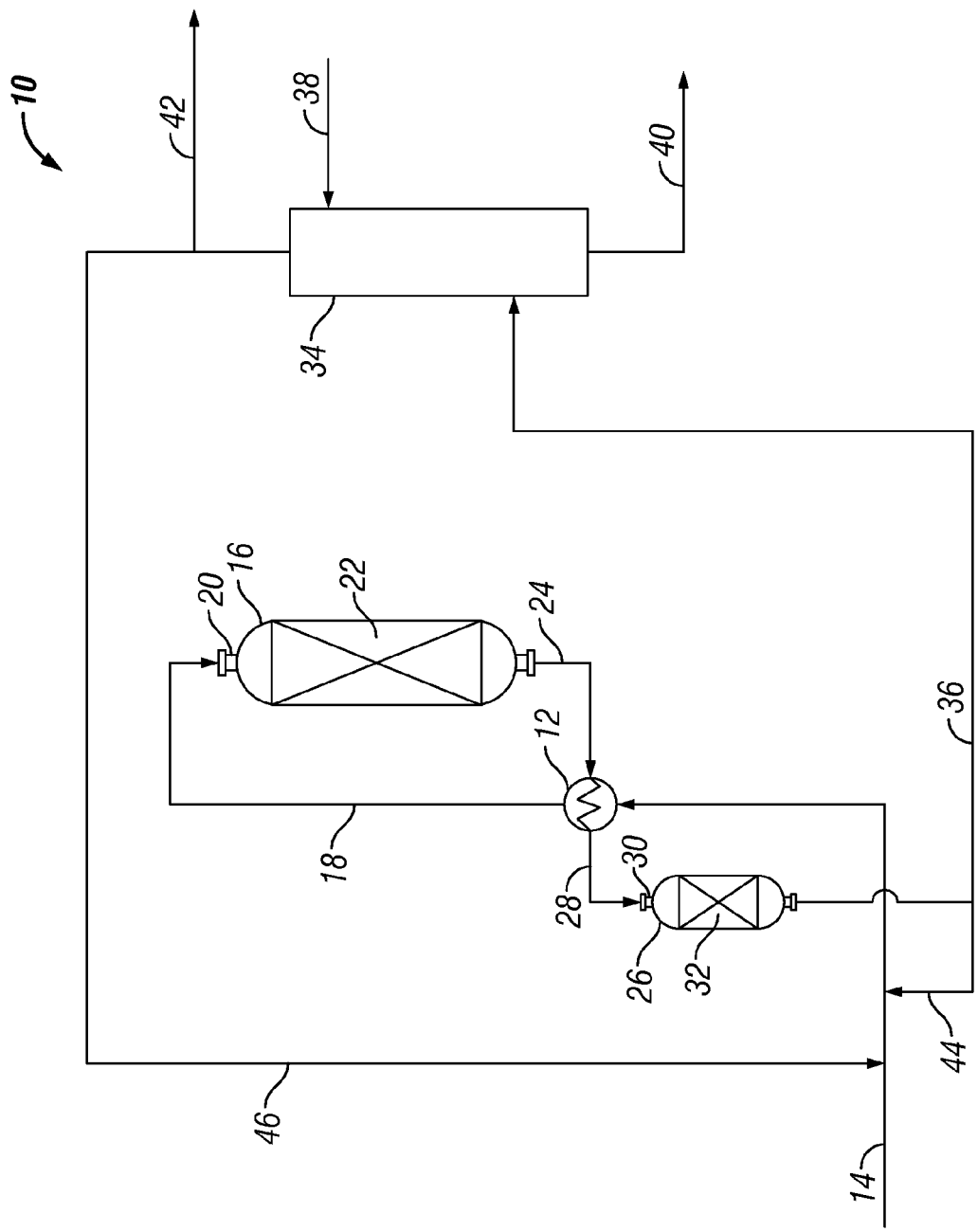

PROCESS FOR REMOVING SULFUR FROM A FUEL GAS STREAM ADDITIONALLY CONTAINING CARBON DIOXIDE AND LIGHT OLEFINS

This application claims the benefit of U.S. Provisional Application No. 60/940,211 filed May 25, 2007, the entire disclosure of which is hereby incorporated by reference.

This invention relates to a process for removing sulfur from a fuel gas stream additionally containing carbon dioxide and light olefins.

There are presently federal regulations that impose certain maximum total sulfur concentration limits on refinery fuel gas streams and there is a trend in certain states and municipalities toward the imposition of even more stringent sulfur requirements for these streams. Among the various approaches that are useful in removing sulfur from refinery fuel gas streams to meet the sulfur regulations, caustic scrubbing and absorption methods are typically used. However, with the significantly lower limits that are being placed on the amount of total sulfur that may be contained within a refinery fuel gas stream, these methods tend to be unsuitable for providing treated refinery fuel gas streams that meet the lower sulfur concentration requirements. Certain of the refinery fuel gas streams such as a coker unit dry gas or a fluid catalytic cracking unit gas can contain concentrations of certain sulfur compounds that are difficult to acceptably be removed therefrom by traditional caustic or absorption scrubbing and other methods to the lower sulfur concentration levels required by the newer regulations.

One inventive process proposed for use in the removal of sulfur from fuel gas streams that contain organic sulfur and significant concentrations of light olefins is that as described and claimed in U.S. provisional application No. 60/911,422, filed 12 Apr. 2007, entitled "A Process for Removing Sulfur From a Fuel Gas Stream," which application is incorporated herein by reference. In this process, highly reactive fuel gas streams that contain significant amounts of light olefin compounds are processed by a catalytic hydrotreating method. The disclosure recognizes the highly exothermic nature of the olefin hydrogenation reaction and notes that it is this attribute of the olefin saturation reaction that causes problems with the hydrotreating of olefin-containing fuel gas streams such as those found in crude oil refinery processes.

The aforementioned provisional application also discloses an inventive process for the hydrotreating of the refinery fuel gas streams that are yielded from the numerous process units of a crude oil refinery. While these refinery fuel gas streams contain organic sulfur and olefins, a number of them also contain concentrations of carbon dioxide. Usually, the presence of carbon dioxide in a fuel gas stream is not a concern, but, in a process for removing sulfur from a fuel gas stream by catalytic hydrotreating, its presence can result in the undesirable formation of carbonyl sulfide (COS) in addition to the hydrogenation conversion of the organic sulfur that is contained in the fuel gas stream to hydrogen sulfide. This occurs as a result of the equilibrium reaction that takes place within the hydrotreater reactor between hydrogen sulfide and carbon dioxide to yield carbonyl sulfide and water, which reaction is represented as follows: $H_2S+CO_2=COS+H_2O$. The formation of the carbonyl sulfide is undesirable because it is more difficult to remove from gas streams by the use of standard amine treatment methods than is hydrogen sulfide.

To address the problem associated with the hydrotreating of a organic sulfur-containing fuel gas stream that additionally contains carbon dioxide, it would be desirable to have a process that more effectively removes organic sulfur from such a fuel gas stream.

Accordingly, provided is a process for removing sulfur from a fuel gas stream that additionally contains carbon dioxide and a light olefin as well as an organic sulfur compound, wherein said process comprises: introducing said fuel gas stream into a hydrotreator reactor, containing a hydrotreating catalyst, wherein said fuel gas stream is contacted under hydrodesulfurization process conditions with said hydrotreating catalyst, and yielding from said hydrotreator reactor a hydrotreated fuel gas containing $H_2S$ and a COS concentration; and introducing said hydrotreated fuel gas into a hydrolysis reactor, containing a hydrolysis catalyst, wherein said hydrotreated fuel gas is contacted under hydrolysis process conditions with said hydrolysis catalyst, and yielding from said hydrolysis reactor a hydrolysis reactor effluent having a reduced COS concentration.

FIG. 1 is a process flow schematic that presents one or more embodiments of the inventive process for removing organic sulfur from a fuel gas stream that additionally contains carbon dioxide and a light olefin in addition to an organic sulfur compound.

The invention relates to the processing of a fuel gas stream that contains concentrations of organic sulfur, light olefins and carbon dioxide by hydrotreating the fuel gas stream in order to significantly reduce the amount of organic sulfur that is contained therein. In the context of a crude oil refinery, hydrotreating is proposed as a means for removing organic sulfur from one or more refinery fuel gas streams followed by the use of an absorption treatment method, such as amine treatment, to thereby remove the hydrogen sulfide from the hydrotreated fuel gas stream to yield a treated fuel gas stream having a reduced concentration of hydrogen sulfide and an overall sulfur content that is low enough to meet many of the more stringent sulfur regulation requirements.

As noted earlier herein, the presence of carbon dioxide in a fuel gas stream that contains organic sulfur will cause the undesirable formation of carbonyl sulfide when the fuel gas stream is hydrotreated by contacting it under hydrodesulfurization process conditions with a hydrotreating catalyst. This formation of the carbonyl sulfide results from the equilibrium reaction of hydrogen sulfide with carbon dioxide to form carbonyl sulfide and water. High temperature conditions shift the reaction toward the formation of carbonyl sulfide. The carbonyl sulfide contained in the hydrotreated fuel gas is difficult to remove therefrom by the use of certain absorption methods, such as, amine treatment, that would normally be used to remove the hydrogen sulfide from the hydrotreated fuel gas as described in U.S. provisional application No. 60/911,422.

One feature of the inventive process is that it provides for the removal of the carbonyl sulfide from the hydrotreated fuel gas by the catalytic reduction of the carbonyl sulfide contained therein to hydrogen sulfide so that it may more easily be removed by standard amine treatment methods. Thus, the inventive process includes a hydrotreating step followed by a reduction or hydrolysis step.

In the hydrotreating step, the fuel gas stream is hydrotreated to yield a hydrotreated fuel gas, containing hydrogen sulfide and, due to the presence of carbon dioxide in the fuel gas stream, carbonyl sulfide, by introducing the fuel gas stream into a hydrotreater reactor that contains a hydrotreating catalyst. Within the hydrotreater reactor, the fuel gas stream is contacted, under suitable hydrodesulfurization reaction conditions, with the hydrotreating catalyst. A hydrotreater reactor effluent, or a hydrotreated fuel gas, that contains hydrogen sulfide and a carbonyl sulfide concentration is yielded from the hydrotreater reactor.

In the hydrolysis or catalytic reduction step, the hydrotreated fuel gas is hydrolyzed to yield a hydrolysis product, or hydrolysis reactor effluent, having a reduced concentration of carbonyl sulfide relative to the carbonyl sulfide concentration of the hydrotreated fuel gas by introducing the hydrotreated fuel gas stream into a hydrolysis reactor that contains a hydrolysis or reduction catalyst. Within the hydrolysis reactor, the hydrotreated fuel gas is contacted, under suitable hydrolysis reaction conditions, with the hydrolysis catalyst. The hydrolysis reaction includes the reaction of carbonyl sulfide with a reducing compound, such as, water, carbon monoxide, and hydrogen, to yield at least hydrogen sulfide. The hydrolysis reactor effluent, thus, contains a reduced concentration of carbonyl sulfide and is yielded from the hydrolysis reactor.

The fuel gas stream of the inventive process contains a concentration of at least one organic sulfur compound and a concentration of at least one light olefin. Also, the fuel gas stream contains carbon dioxide at a concentration such that when the fuel gas stream is subjected to hydrodesulfurization process conditions when contacted with the hydrotreating catalyst within the hydrotreater reactor the aforementioned equilibrium reaction occurs and incremental carbonyl sulfide is yielded with the hydrotreated fuel gas.

The amount of carbon dioxide in the fuel gas stream can vary widely depending upon the particular source of the fuel gas. But, generally, it will be present at reasonably low but undesirable concentration levels that can range upwardly to about 5 vol %. Typically, the carbon dioxide concentration of the fuel gas stream of the inventive process can be in the range of from 1 ppmv to 3 vol %, and, more typically, it is in the range of from 2 ppmv to 1 vol %. Most typically, however, the carbon dioxide concentration of the fuel gas stream of the inventive process is in the range of from 5 ppmv to 0.8 vol % (8,000 ppmv).

The sulfur compounds that can be present in the fuel gas stream can include organic sulfur compounds that include thiol compounds, thiophene compounds, disulfide compounds and carbonyl sulfide. The thiol compounds can include one or more of the various aliphatic mercaptans, such as, for example, methyl mercaptan, ethyl mercaptan, propyl mercaptan, butyl mercaptan, and amyl mercaptan, and aromatic mercaptans, such as, for example, phenyl mercaptan. The thiopheneic compounds can include thiophene and any of the benzothiophenes and substituted thiophenes.

The concentration of the mercaptans in the fuel gas stream is generally in the range upwardly to 5000 ppmv (0.5 volume percent of the fuel gas stream). But, for the inventive process, the mercaptan concentration in the fuel gas stream to be treated will, typically, be more than 20 ppmv and in the range of from 20 ppmv to 3000 ppmv. More typically, the mercaptan concentration is in the range of from 40 ppmv to 2000 ppmv, and, most typically, from 45 ppmv to 1500 ppmv.

The organic sulfur compounds that include thiophenes, organic disulfides and carbonyl sulfide are the more difficult compounds to remove from a fuel gas stream by use of conventional sulfur removal methods. The concentration of the these organic sulfur compounds in the fuel gas stream of the inventive process can, collectively, be in the range of from 1 ppmv to 500 ppmv, but, typically, the collective concentration of these organic sulfur compounds will be in the range of from 2 to 300 ppmv, and, more typically, from 3 to 200 ppmv. The specific concentration of the carbonyl sulfide in the fuel gas stream can be upwardly to 500 ppmv, and, more typically, from 1 to 300 ppmv.

The total concentration of all the organic sulfur compounds, including thiol compounds, thiophene compounds, disulfide compounds and carbonyl sulfide, contained in the fuel gas stream of the inventive process is, typically, in the range of from 40 ppmv to 5000 ppmv. More typically, the total concentration of all the organic sulfur compounds contained in the fuel gas stream to be treated is in the range of from 45 ppmv to 3000 ppmv, and, most typically, from 50 ppmv to 2000 ppmv.

As for the concentration of light olefins in the fuel gas stream to be treated by the inventive process, it can, depending upon the particular source or sources of the fuel gas stream, be in the range upwardly to 50 volume percent (%) of the fuel gas stream. For instance, an FCC dry gas will contain significantly higher quantities of light olefins as compared to fuel gas streams from other sources, but, typically, the light olefin concentration of the fuel gas stream of the inventive process will be in the range of from 0.1 vol % to 45 vol %, more typically, from 0.5 vol % to 40 vol %, and, most typically, from 1 vol % to 30 vol %.

The inventive process is particularly useful in the processing of refinery fuel gas streams that are yielded from any one or more of the numerous process units of a crude oil refinery. These refinery streams may separately be introduced into the hydrotreater reactor of the inventive process, or they may be combined in any manner and by any means and introduced as one or more combined feeds into the hydrotreater reactor of the inventive process. Typical refinery gas streams that are to be feed streams to the hydrotreater reactor of the inventive process are those generated by a delayed coker unit, such as the coker dry gas and coker propylene vapor, a fluid catalytic cracking unit, such as the FCC dry gas, a flare gas recovery system, tank vents, and vapor overheads from crude unit atmospheric and vacuum towers. The gas streams yielded from these process units can have significant concentrations of organic sulfur compounds. The types and concentrations of the organic sulfur compounds are as previously described in detail herein.

An additional characteristic of the refinery fuel gas streams is that they can include significant concentration levels of light or lower olefin compounds, such as ethylene, propylene, butenes and pentenes. More typically, the lower olefin compounds contained in the refinery fuel gas streams of the inventive process include those selected from the group consisting of ethylene, propylene, butylenes and any combination thereof. Typical concentration ranges for these light olefins in the refinery gas streams are as previously described herein.

Many of the refinery gas streams will also have concentrations of carbon dioxide that are typically within the ranges as previously described herein. The refinery gas streams thought to have the highest concentrations of carbon dioxide are those that are yielded from such refinery units as a delayed coker unit and a fluid catalytic cracking unit.

It is preferred to utilize in the hydrotreating step a hydrotreater reactor, which includes a reactor vessel that defines a volume and in which is contained one or more beds of hydrotreating catalyst. The fuel gas stream is introduced into the hydrotreater reactor wherein it is contacted with the hydrotreating catalyst. The reaction conditions within the reactor vessel are maintained at hydrodesulfurization conditions in order to promote the catalytic conversion of the organic sulfur compounds to hydrogen sulfide. A hydrotreater reactor effluent, or hydrotreated fuel gas, is yielded from the hydrotreater reactor that has a hydrogen sulfide concentration and a carbonyl sulfide concentration. Much of the carbonyl sulfide contained in the hydrotreated fuel gas results from the aforementioned equilibrium reaction that takes place between hydrogen sulfide, which source may be from the hydrogenation reaction of organic sulfur compounds of the fuel gas stream, and the carbon dioxide contained in the fuel gas stream.

The hydrotreating catalyst of the inventive process is typically used to form one or more beds of hydrotreating catalyst within the hydrotreater reactor and can be any suitable hydrogenation catalyst including conventional hydrotreating catalysts that comprise a metal component on a support material. The metal component can include a Group VIB metal component or a Group VIII metal component, or both metal components. It is preferred for the hydrotreating catalyst to comprise both a Group VIB metal component and a Group VIII metal component. The hydrotreating catalyst can also include a promoter such as a phosphorous component.

The Group VIII metal component of the hydrotreating catalyst composition is selected from those Group VIII metal or metal compounds that, in combination with the other components of the catalyst composition, suitably provide a hydrotreating catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydrotreating catalyst composition can be in the elemental form or in the form of a metal compound, such as, for example, oxides, sulfides and the like. The amount of Group VIII metal in the hydrotreating catalyst composition can be in the range of from about 0.1 to about 6 weight percent elemental metal based on the total weight of the hydrotreating catalyst composition. Preferably, the concentration of Group VIII metal in the hydrotreating catalyst composition is in the range of from 0.3 weight % to 5 weight %, and, most preferably, the concentration is in the range of from 0.4 weight % to 4.5 weight %.

The Group VIB metal component of the hydrotreating catalyst composition is selected from those Group VIB metal or metal compounds that, in combination with the other elements of the hydrotreating catalyst composition, suitably provide a hydrotreating catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydrotreating catalyst composition can be in the elemental form or in the form of a metal compound, such as, for example, oxides, sulfides and the like. The amount of Group VIB metal in the hydrotreating catalyst composition can be in the range of from about 2 to about 25 weight percent elemental metal based on the total weight of the hydrotreating catalyst composition. Preferably, the concentration of Group VIB metal in the hydrotreating catalyst composition is in the range of from 6 weight % to 18 weight %, and, most preferably, the concentration is in the range of from 7 weight % to 16 weight %.

The support material of the hydrotreating catalyst can be any material that suitably provides a support for the metal hydrogenation components of the hydrotreating catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 30 Angstroms to about 500 Angstroms, preferably, from 50 Angstroms to 400 Angstroms, and, most preferably, from 60 Angstroms to 300 Angstroms. The total pore volume of the porous refractory oxide, as measured by standard mercury porosimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 50 $m^2$/gram, and it is typically in the range of from about 100 to about 500 $m^2$/gram.

The temperature and pressure conditions within the hydrotreater reactor vessel are controlled so as to provide suitable hydrodesulfurization reaction conditions for the hydrogenation of the organic sulfur compounds contained in the fuel gas stream introduced into the hydrotreater reactor vessel. The contacting temperature should generally be in the range of from 230° C. (446° F.) to 480° C. (896° F.), preferably, from 255° C. (491° F.) to 450° C. (842° F.), and, most preferably, from 270° C. (518° F.) to 430° C. (806° F.). As for the contacting pressure, it should generally in the range of from 30 psig to 600 psig, preferably, from 50 psig to 500 psig, and, most preferably, from 70 psig to 400 psig.

The flow rates at which the fuel gas stream is charged to the hydrotreater reactor vessel of the inventive process are generally such as to provide a gaseous hourly space velocity (GHSV) in the range of from 0.01 $hr^{-1}$ to 6000 $hr^{-1}$. The term "gaseous hourly space velocity," as used herein, means the numerical ratio of the rate at which the fuel gas stream, including added hydrogen, if any, that is charged to the hydrotreater reactor vessel in volume (at standard temperature and pressure conditions) per hour divided by the volume of hydrotreating catalyst contained in the hydrotreating reactor vessel to which the fuel gas stream is charged. The preferred GHSV is in the range of from 0.05 $hr^{-1}$ to 4000 $hr^{-1}$, more preferably, from 0.1 $hr^{-1}$ to 3500 $hr^{-1}$, and, most preferably, from 0.2 $hr^{-1}$ to 3200 $hr^{-1}$.

As a result of the hydrodesulfurization reactions of the hydrotreating step, the hydrotreated fuel gas that is yielded from the hydrotreater reactor will have a significantly reduced organic sulfur concentration that is below the organic sulfur concentration of the fuel gas stream that is introduced as a feed to the hydrotreater reactor for hydrodesulfurization. But, the hydrotreated fuel gas will also contain an amount of hydrogen sulfide that needs to be removed therefrom in order to ultimately provide a treated fuel gas stream that has a reduced concentration of hydrogen sulfide that is low enough to comply with regulations regarding sulfur concentration limits for fuel gas streams that are to be combusted. One method for removing the hydrogen sulfide from the hydrotreated fuel gas stream is by use of any suitable method or means of absorption treating that utilizes an amine absorbent. One problem, however, with the use of amine absorption techniques in the removal of the hydrogen sulfide from the hydrotreated fuel gas of the inventive process is that the hydrotreated fuel gas also can have a concentration of carbonyl sulfide which is difficult to remove by the use of standard amine absorption techniques.

The carbonyl sulfide concentration of the hydrotreated fuel gas will generally be in the range upwardly to about 2 vol % and, typically, it can be in the range of from 1 ppmv to 1.5 vol %. More typically, the carbonyl sulfide concentration of the hydrotreated fuel gas stream can be in the range of from 2 ppmv to 1 vol %, and, most typically, from 3 ppmv to 0.5 vol % (5,000 ppmv).

It is desirable to remove a substantial portion of the carbonyl sulfide contained in the hydrotreated fuel gas prior to its treatment by an amine absorption technique. The inventive process provides for the removal of the carbonyl sulfide of the hydrotreated fuel gas by use of a catalytic reduction or hydrolysis step in which the carbonyl sulfide, and, if present, certain other sulfur compounds other than hydrogen sulfide, such as sulfur dioxide and carbon disulfide, is reduced by a reducing agent such as water, hydrogen and carbon monoxide.

It is preferred to utilize in this hydrolysis or reducing step a hydrolysis reactor, which includes a hydrolysis reactor vessel that defines a volume and in which is contained one or more beds of reduction or hydrolysis catalyst. The hydrotreated fuel gas stream is introduced into the hydrolysis reactor, wherein it is contacted with the hydrolysis catalyst. The reaction conditions within the reactor vessel are maintained at hydrolysis reaction conditions in order to promote the catalytic conversion of the carbonyl sulfide to hydrogen sulfide.

A hydrolysis reactor effluent is yielded from the hydrolysis reactor that has a significantly reduced carbonyl sulfide concentration below that of the hydrotreated fuel gas stream charged to the reduction reactor and is at least less than 1000 ppmv. It is desirable for the reduced carbonyl sulfide concentration of the hydrolysis reactor effluent to be less than 500 ppmv, and, more desirably, less than 100 ppmv. It is most desirable for the carbonyl sulfide concentration of the hydrolysis reactor effluent to be less than 10 ppmv.

The hydrolysis conversion of the carbonyl sulfide contained in the hydrotreated fuel gas by the hydrolysis step should be at least 50 vol % of the carbonyl sulfide. But, it is preferred for such conversion of the carbonyl sulfide to be higher and to exceed 70 vol %. It is most preferred for the carbonyl sulfide conversion to exceed 90 vol %, and, with the use of certain titania based hydrolysis catalysts, as hereinafter described, it is even possible to obtain conversions of carbonyl sulfide that exceed 95 vol %, and, even exceed 97 vol % or 99 vol %, of the carbonyl sulfide contained in the hydrotreated fuel gas.

The hydrolysis catalyst used in the hydrolysis step of the process can be any suitable hydrolysis catalyst known to those skilled in the art including hydrolysis catalysts that comprise a refractory oxide material selected from the group consisting of alumina ($Al_2O_3$), titania ($TiO_2$), zirconia ($ZrO_2$), silica ($SiO_2$), ceria, gallia and mixtures of any combination of two or more thereof. Preferred among these are alumina, titania and zirconia, and, most preferred is titania. In one embodiment of the inventive process, a particularly useful hydrolysis catalyst comprises a composite of alumina and titania. The alumina titania composite hydrolysis catalyst can contain a substantial amount of titania that is present in the hydrolysis catalyst generally in the range of from 0.5 wt. % to 99 wt. %, with the weight percent being based on the total weight of the hydrolysis catalyst, with the balance being alumina. Other formulations of the alumina titania composite hydrolysis catalyst can include titania in the range of from 5 wt. % to 75 wt. %, and, more particularly, from 5 to 30 wt. %, with the balance being alumina.

The hydrolysis catalyst may also be promoted with one or more promoter compounds such as compounds of lithium, sodium, potassium, magnesium, calcium, lanthanum, and cerium. If the hydrolysis catalyst is promoted with a promoter compound, such promoter compound can be present in the hydrolysis catalyst in an amount in the range upwardly to 15 wt. %, based on the element, regardless of the form in which it is actually present in the hydrolysis catalyst, and the total weight of the hydrolysis catalyst.

The hydrolysis catalyst should have a reasonably high surface area, which, as measured by the B.E.T. method, generally exceeds 50 $m^2$/gram, and it is typically in the range of from about 100 to about 500 $m^2$/gram. The preferred surface area of the hydrolysis catalyst is in the range of from 150 to 400 $m^2$/gram.

It is desirable for the hydrolysis catalyst to have a low macroporosity, as measured by standard mercury porosimetry methods, with the total pore volume in the macropores having a pore diameter greater than 750 Angstroms being less than 0.3 cc/gram, preferably, less than 0.2 cc/gram, and, most preferably, less than 0.15 cc/gram.

The hydrolysis catalyst generally should have an average pore diameter in the range of from about 30 Angstroms to about 500 Angstroms, preferably, from 50 Angstroms to 400 Angstroms, and, most preferably, from 60 Angstroms to 300 Angstroms.

The total pore volume of the hydrolysis catalyst, as measured by standard mercury porosimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram.

The hydrolysis catalyst may also include supported catalysts that comprise a support material and a metal component. The metal component can be either a Group VIB metal component or a Group VIII metal component, or both metal components The Group VIII metal component of the supported hydrolysis catalyst composition is selected from those Group VIII metal or metal compounds that, in combination with the other components of the catalyst composition, suitably provide a hydrolysis catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydrolysis catalyst composition can be in the elemental form or in the form of a metal compound, such as, for example, oxides, sulfides and the like. The amount of Group VIII metal in the hydrolysis catalyst composition can be in the range of from about 0.1 to about 6 weight percent elemental metal based on the total weight of the hydrolysis catalyst composition. Preferably, the concentration of Group VIII metal in the hydrolysis catalyst composition is in the range of from 0.3 weight % to 5 weight %, and, most preferably, the concentration is in the range of from 0.4 weight % to 4.5 weight %.

The Group VIB metal component of the hydrolysis catalyst composition is selected from those Group VIB metal or metal compounds that, in combination with the other elements of the hydrolysis catalyst composition, suitably provide a hydrolysis catalyst. The Group VIB metal can be selected from the group consisting of chromium, molybdenum and tungsten. The preferred Group VIB metal is either molybdenum or chromium.

The Group VIB metal component contained in the hydrolysis catalyst composition can be in the elemental form or in the form of a metal compound, such as, for example, oxides, sulfides and the like. The amount of Group VIB metal in the hydrolysis catalyst composition can be in the range of from about 2 to about 25 weight percent elemental metal based on the total weight of the hydrolysis catalyst composition. Preferably, the concentration of Group VIB metal in the hydrolysis catalyst composition is in the range of from 6 weight % to 18 weight %, and, most preferably, the concentration is in the range of from 7 weight % to 16 weight %.

The support material used in the supported hydrolysis catalyst can be any material that suitably provides a support for the metal components including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The temperature and pressure conditions within the hydrolysis reactor vessel are controlled so as to provide for suitable hydrolysis conditions for the hydrolysis of the carbonyl sulfide of the hydrotreated fuel gas stream by the reducing agent of either water, hydrogen, carbon monoxide or any combination thereof to hydrogen sulfide. The temperature conditions for the hydrolysis step is, in general, cooler than is required for the hydrotreating step, and, thus, it is desirable to cool the hydrotreated fuel gas prior to introducing it into the hydrolysis reactor. Typically, the temperature of the hydrotreated fuel gas introduced into the hydrolysis reactor, or the hydrolysis reactor inlet temperature, ought to be in the range of from 75° C. to 265° C. It is preferred for the hydrolysis reactor inlet temperature to be in the range of from 85° C. to 250° C., and, most preferred, from 100° C. to 225° C.

As for the contacting pressure in the hydrolysis reactor, it should generally be in the range of from 30 psig to 600 psig, preferably, from 50 psig to 500 psig, and, most preferably, from 70 psig to 400 psig.

The flow rate at which the hydrotreated fuel gas stream is charged to the hydrolysis reactor vessel of the inventive process are generally such as to provide a gaseous hourly space velocity (GHSV) in the range of from 0.01 $hr^{-1}$ to 6000 $hr^{-1}$. The term "gaseous hourly space velocity", as used herein, means the numerical ratio of the rate at which the fuel gas stream, including added hydrogen, if any, that is charged to the hydrolysis reactor vessel in volume (at standard temperature and pressure conditions) per hour divided by the volume of hydrolysis catalyst contained in the hydrolysis reactor vessel to which the fuel gas stream is charged. The preferred GHSV is in the range of from 0.05 $hr^{-1}$ to 4000 $hr^{-1}$, more preferably, from 0.1 $hr^{-1}$ to 3500 $hr^{-1}$, and, most preferably, from 0.2 $hr^{-1}$ to 3200 $hr^{-1}$.

Because of the heat released from the hydrogenation reactions within the hydrotreater reactor, the hydrotreated fuel gas stream will have a temperature that is significantly higher than the temperature of the fuel gas stream that is introduced into the hydrotreater reactor at the hydrotreater reactor inlet. As already noted, it is desirable for the hydrotreated fuel gas stream to be cooled prior to its introduction into the hydrolysis reactor. This cooling can be done by any suitable method or means known to those skilled in the art, but it is preferred to recover a portion of the heat that is released by the hydrogenation reactions in the hydrotreater reactor and contained in the hydrotreated fuel gas stream by exchanging heat energy contained therein with at least a portion of the fuel gas stream that is introduced into the hydrotreater reactor. This may be accomplished by the use of a feed/effluent heat exchanger that provides heat exchange means for exchanging heat energy between at least a portion of the fuel gas stream and at least a portion of the hydrotreated fuel gas stream to thereby provide the hydrotreated fuel gas stream having the hydrolysis reactor inlet temperature and the fuel gas stream having the hydrotreator reactor inlet temperature.

The hydrolysis reactor effluent can further be treated to remove the hydrogen sulfide therefrom by the use of any suitable means or method for reducing the hydrogen sulfide content of the hydrolysis reactor effluent, or portions thereof, so as to provide a treated fuel gas stream having a reduced concentration of hydrogen sulfide that, generally, is less than 100 ppmv. It is, however, desirable to provide a treated fuel gas stream that has a hydrogen sulfide concentration of less than 80 ppmv, and, more desirably, the hydrogen sulfide concentration of the treated fuel gas stream is less than 60 ppmv. It is especially desirable for the treated fuel gas stream to have a hydrogen sulfide concentration of less than 40 ppmv, and, more especially, less than 10 ppmv. This reduced concentration of hydrogen sulfide provides a treated fuel gas that will meet most of the more stringent sulfur regulations and that has a suitably low hydrogen sulfide concentration such that it may be combusted or burned in typical combustion devices or means for combusting or burning treated fuel gas. Examples of such combustion means include the burners that are used in refinery heaters, furnaces, flares, and other equipment.

A preferred method of treating the hydrolysis reactor effluent, or portions thereof, is to remove the $H_2S$ by the use of traditional absorption scrubbing of the gas stream to remove the $H_2S$ contained therein. This is done by contacting the hydrolysis reactor effluent, or a portion thereof, with a suitable absorbent and yielding a treated fuel gas having the reduced concentration of $H_2S$ and the absorbent that is rich in $H_2S$. Among the absorption processes that may suitably be used to treat the hydrolysis reactor effluent, amine treating is preferred. Amine treating includes the use of any known amine absorbent, such as, for example, monoethanolamine (MEA), diethanolamine (DEA), methyldiethanolamine (MDEA), diisopropylamine (DIPA), and diglycolamine (DGA).

In one embodiment of the invention, a feature is provided to address certain of the problems associated with the hydrotreating of refinery gas streams that contain high concentrations of light olefins and the high heat release resulting therefrom. It has been determined that either a portion of the hydrolysis reactor effluent or of the treated fuel gas stream, or both such streams, can be combined with the refinery gas stream that is charged to the hydrotreater reactor to serve as a diluent to help in the control of the temperature across the hydrotreater reactor.

Both of these streams are particularly good diluents; because, they contain relatively low concentrations of reactive compounds as a result of being product streams from the hydrotreating and hydrolysis steps of the process. However, it is preferred to use as a recycle diluent a portion of the treated fuel gas stream instead of the hydrolysis reactor effluent because of the importance of minimizing in the hydrotreating step the yield of carbonyl sulfide. Use of the treated fuel gas stream as a recycle diluent is preferable; since, as a product of an absorption treatment whereby the hydrogen sulfide and carbon dioxide, if any, have been removed therefrom, there is no or very little hydrogen sulfide or carbon dioxide present that has the tendency to push the equilibrium reaction of hydrogen sulfide with carbon dioxide toward making of carbonyl sulfide. Thus, less carbonyl sulfide is made in the hydrotreating step by using as a recycle stream the treated fuel gas stream instead of the hydrolysis reactor effluent.

Reference is now made to the process flow schematic of FIG. 1, which includes for illustrative purposes various embodiments of the inventive process. Depicted in FIG. 1 is a fuel gas treating process 10 for the removal of sulfur from a fuel gas stream that additionally contains carbon dioxide and a light olefin as well as an organic sulfur compound. The fuel gas stream is passed to a heat exchanger 12 by way of conduit 14. The heat exchanger 12 provides for a heated fuel gas stream that passes from heat exchanger 12 to hydrotreater reactor 16 by way of conduit 18. The fuel gas stream having a hydrotreater reactor inlet temperature is introduced into hydrotreater reactor 16 at hydrotreater reactor inlet 20. The hydrotreater reactor 16 defines a hydrotreater reactor volume in which is contained a bed of hydrotreating catalyst 22 over which the fuel gas stream is passed and whereby it is contacted under hydrodesulfurization process conditions. A hydrotreated fuel gas that contains hydrogen sulfide and a concentration of carbonyl sulfide is yielded from the hydrotreater reactor 16 as a hydrotreater reactor effluent stream by way of conduit 24.

As a result of the hydrogenation reactions that take place in the hydrotreater reactor 16, the hydrotreated fuel gas has a hydrotreater reactor effluent temperature that is greater than the hydrotreater reactor inlet temperature and one way of recovering this heat of reaction is to use the heat exchanger 12 as a feed/effluent exchanger. Prior to introducing the hydrotreated fuel gas into the hydrolysis reactor 26, heat exchanger 12 is utilized to cool the hydrotreated fuel gas to a hydrolysis reactor inlet temperature. The cooled hydrotreated fuel gas, having a hydrolysis reactor inlet temperature, passes from heat exchanger 12 by way of conduit 28 to be introduced at the hydrolysis reactor inlet 30 into the hydrolysis reactor 26. Hydrolysis reactor 26 defines a hydrolysis reactor volume in which is contained a bed of reduction or hydrolysis catalyst 32 over which the hydrotreated fuel gas is passed and whereby it is contacted under hydrolysis process conditions.

A hydrolysis reactor effluent having a reduced concentration of carbonyl sulfide is yielded and passed from the hydrolysis reactor 26 to absorption unit 34 by way of conduit 36. The absorption unit 34 provides for the removal of hydrogen sulfide that is contained in the hydrolysis reactor effluent by contacting it with a suitable absorbent fluid. A lean absorbent fluid is introduced to the absorption unit 34 through conduit 38 and a rich absorbent fluid containing hydrogen sulfide that is removed from the hydrolysis reactor effluent passes from the absorption unit 34 by way of conduit 40. A treated fuel gas having a significantly reduce concentration of hydrogen sulfide passes from the absorption unit 34 by way of conduit 42 to any suitable combustion device or means (not shown) for burning or combusting the treated fuel gas, such as, for example, burners that are used in refinery heaters, furnaces, flares and other equipment.

Various recycle streams may be used to control and improve upon the hydrodesulfurization conditions within the hydrotreater reactor 16. Either a portion of the treated fuel gas stream or a portion of the hydrolysis reactor effluent, or both such streams, may be recycled and used as either a diluent to be combined with the fuel gas stream that is charged to the hydrotreater reactor 16 or as a quench stream that is introduced directly into the hydrotreater reactor 16. Thus, at least a portion of the hydrolysis reactor effluent passing through conduit 36 passes by way of conduit 44 and is combined with the fuel gas stream passing through conduit 14, or alternatively, with the heated fuel gas stream passing through conduit 18 (not shown), or alternatively, as a quench stream directly into hydrotreating reactor 16 (not shown), so as to be introduced along with the introduction of the fuel gas stream into hydrotreater reactor 16. Also, a portion of the treated fuel gas stream passing through conduit 42 passes by way of conduit 46 and is combined with the fuel gas stream passing through conduit 14, or alternatively, with the heated fuel gas stream passing through conduit 18 (not shown), or alternatively, as a quench stream directly into hydrotreating reactor 16 (not shown), so as to be introduced along with the introduction of the fuel gas stream into hydrotreater reactor 16.

Because the fuel gas stream has had a significant portion of the hydrogen sulfide and carbon dioxide removed therefrom by the absorption unit 34, it is preferred to use the treated fuel gas stream as a recycle stream of the fuel gas treating process 10 as opposed to using the hydrolysis reactor effluent as a recycle stream. The absence of significant concentration levels of hydrogen sulfide and carbon dioxide in the treated fuel gas stream contribute to reaction conditions within the hydrotreating reactor 16 that favor yielding less carbonyl sulfide.

That which is claimed is:

1. A process for removing sulfur from a fuel gas stream to a hydrogen sulfide concentration of less than 10 ppmv, said fuel gas stream comprising a carbon dioxide concentration in the range of from 1 ppmv to 3 vol %, a light olefin concentration in the range of from 0.5 vol % to 40 vol %, and an organic sulfur compound concentration in the range of from 40 ppmv to 5000 ppmv, wherein said process comprises:
    (a) introducing said fuel gas stream into a hydrotreater reactor containing a hydrotreating catalyst, wherein said fuel gas stream is contacted under hydrodesulfurization process conditions with said hydrotreating catalyst, wherein said hydrodesulfurization process conditions include a hydrodesulfurization contacting temperature in the range of from 230° C. to 480° C., a hydrodesulfurization contacting pressure in the range of from 30 psig to 600 psig, and a hydrodesulfurization GHSV that is in the range of from 0.01 $hr^{-1}$ to 6000 $hr^{-1}$, and yielding from said hydrotreater reactor a hydrotreated fuel gas containing $H_2S$ and a COS concentration in the range of from 1 ppmv to 1.5 vol %;
    (b) introducing said hydrotreated fuel gas into a hydrolysis reactor containing a hydrolysis catalyst, which catalyst has a total pore volume in the range of from 0.3 cc/gram to 1.5 cc/gram, and a low macroporosity, with the total pore volume in macropores having a pore diameter of greater than 750 angstroms of less than 0.2 cc/gram, wherein the hydrolysis process conditions in said hydrolysis reactor include a hydrolysis reactor inlet temperature in the range of from 75° C. to 265° C., a hydrolysis contacting pressure in the range of from 30 psig to 600 psig and a hydrolysis GHSV that is in the range of from 0.01 $hr^{-1}$ to 6000 $hr^{-1}$, wherein said hydrotreated fuel gas is contacted under said hydrolysis process conditions with said hydrolysis catalyst thereby converting COS to hydrogen sulfide, and yielding from said hydrolysis reactor a hydrolysis reactor effluent having a reduced COS concentration of less than 10 ppmv;
    (c) treating said hydrolysis reactor effluent in an absorption unit employing an amine absorbent to remove hydrogen sulfide, yielding a treated fuel gas stream having less than 10 ppmv $H_2S$; and
    (d) diluting the light olefin-containing fuel gas stream in step (a) with a portion of the treated fuel gas from step (c) to help control the temperature of the hydrotreater reactor to avoid problems attributable to the olefin hydrogenation reaction.

2. A process as recited in claim 1, further comprising:
    prior to introducing said hydrotreated fuel gas into said hydrolysis reactor, cooling said hydrotreated fuel gas to said hydrolysis reactor inlet temperature; and providing to said hydrotreater reactor said fuel gas stream having a hydrotreater reactor inlet temperature so as to provide said hydrodesulfurization contacting temperature.

3. A process as recited in claim 2, wherein said cooling step includes:
exchanging heat energy between at least a portion of said fuel gas stream and at least a portion of said hydrotreated fuel gas by use of a first heat exchanger to thereby provide said hydrotreated fuel gas having said hydrolysis reactor inlet temperature and said fuel gas stream having said hydrotreater reactor inlet temperature.

4. A process as recited in claim 3, wherein the catalytic conversion of COS in step (b) exceeds 90 vol %.

5. A process as recited in claim 4, wherein said hydrolysis catalyst in step (b) has a surface area in the range of 150 to 400 $m^2/g$.

6. A process as recited in claim 5, wherein said hydrolysis catalyst in step (b) has a total pore volume in the range of from 0.4 cc/gram.

7. A process as recited in claim 6, wherein the catalytic conversion of COS in step (b) exceeds 97 vol %.

8. A process as recited in claim 1, wherein said hydrolysis catalyst in step (b) comprises an alumina titania composite containing from 0.5 wt % to 99 wt % titania.

9. A process as recited in any one of claims 1 through 4, wherein the olefin concentration in the fuel gas stream into the hydrotreater reactor in step (a) is from 1 vol % to 30 vol %.

10. A process as recited in claim 8, wherein said hydrolysis catalyst is promoted with one or more promoter compounds selected from the group consisting of lithium, sodium, potassium, magnesium, calcium, lanthanum and cerium.

11. A process as recited in claim 7, wherein the catalytic conversion of COS in step (b) exceeds 99 vol %.

12. A process as recited in claim 8, wherein said hydrolysis catalyst has a total pore volume in macropores having a pore diameter of greater than 750 angstroms of less than 0.15 cc/gram.

13. A process as recited in claim 1, wherein said hydrolysis catalyst in step (b) is a supported catalyst comprising a porous refractory oxide support material and a metal component selected from the group consisting of Group VIB metal component, Group VIII metal component and mixtures thereof.

14. A process as recited in claim 13, wherein the porous refractory support material is gamma alumina, the Group VIB metal component is selected from the group consisting of molybdenum and chromium, and the Group VIII metal component is cobalt.

* * * * *